(12) United States Patent
Kuniyuki et al.

(10) Patent No.: US 8,144,205 B2
(45) Date of Patent: Mar. 27, 2012

(54) ELECTRONIC CAMERA WITH FEATURE IMAGE RECOGNITION

(75) Inventors: Osamu Kuniyuki, Gifu (JP); Hiroyuki Hasegawa, Gunma (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1094 days.

(21) Appl. No.: 12/021,721

(22) Filed: Jan. 29, 2008

(65) Prior Publication Data

US 2008/0180542 A1  Jul. 31, 2008

(30) Foreign Application Priority Data

Jan. 30, 2007 (JP) ................. 2007-018630

(51) Int. Cl.
  *H04N 5/225* (2006.01)
  *H04N 5/228* (2006.01)
(52) U.S. Cl. ............ 348/220.1; 348/222.1; 382/117
(58) Field of Classification Search ........... 348/220.1, 348/220.2, 222.1
See application file for complete search history.

(56) References Cited

U.S. PATENT DOCUMENTS

| | | | |
|---|---|---|---|
| 7,564,486 B2 * | 7/2009 | Ikeda | 348/222.1 |
| 2003/0197792 A1 * | 10/2003 | Kikuchi | 348/220.1 |
| 2004/0047494 A1 * | 3/2004 | Lee et al. | 382/118 |
| 2005/0088538 A1 | 4/2005 | Nozaki et al. | |
| 2006/0028576 A1 | 2/2006 | Ito | |
| 2007/0065039 A1 * | 3/2007 | Park et al. | 382/275 |
| 2007/0183638 A1 * | 8/2007 | Nakamura | 382/128 |
| 2007/0188644 A1 | 8/2007 | Okamoto | |
| 2008/0205866 A1 * | 8/2008 | Sakamoto | 396/5 |
| 2011/0115940 A1 * | 5/2011 | Ojima et al. | 348/222.1 |

FOREIGN PATENT DOCUMENTS

| | | |
|---|---|---|
| JP | 2005-84985 A | 3/2005 |
| JP | 2005-117530 A | 4/2005 |
| JP | 2006-5662 A | 1/2006 |
| JP | 2006-25238 A | 1/2006 |
| JP | 2007-221312 A | 8/2007 |

OTHER PUBLICATIONS

Japanese Office Action dated Nov. 25, 2008 (mailing date), issued in corresponding Japanese Patent Application No. 2007-018630.

* cited by examiner

*Primary Examiner* — Hung Lam
(74) *Attorney, Agent, or Firm* — Westerman, Hattori, Daniels & Adrian, LLP

(57) ABSTRACT

An electronic camera includes an image sensor, and an object scene image is repetitively output from the image sensor. A CPU repetitively determines whether or not the object scene image output from the image sensor has a face image turned to the imaging surface prior to a half depression of a shutter button. A face detection history including a determination result is produced on a face detection history table by the CPU. The CPU decides a face image position on the basis of the face detection history described in the face detection history table when the shutter button is half-depressed. An imaging condition such as a focus, etc. is adjusted by noting the determined face image position.

12 Claims, 11 Drawing Sheets

| 0,0 | 0,1 | 0,2 | 0,3 | 0,4 | 0,5 | 0,6 | 0,7 | 0,8 | 0,9 | 0,10 | 0,11 | 0,12 | 0,13 | 0,14 | 0,15 |
|---|---|---|---|---|---|---|---|---|---|---|---|---|---|---|---|
| 1,0 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 |
| 2,0 | 2,1 | 2,2 | 2,3 | 2,4 | 2,5 | 2,6 | 2,7 | 2,8 | 2,9 | 2,10 | 2,11 | 2,12 | 2,13 | 2,14 | 2,15 |
| 3,0 | 3,1 | 3,2 | 3,3 | 3,4 | 3,5 | 3,6 | 3,7 | 3,8 | 3,9 | 3,10 | 3,11 | 3,12 | 3,13 | 3,14 | 3,15 |
| 4,0 | 4,1 | 4,2 | 4,3 | 4,4 | 4,5 | 4,6 | 4,7 | 4,8 | 4,9 | 4,10 | 4,11 | 4,12 | 4,13 | 4,14 | 4,15 |
| 5,0 | 5,1 | 5,2 | 5,3 | 5,4 | 5,5 | 5,6 | 5,7 | 5,8 | 5,9 | 5,10 | 5,11 | 5,12 | 5,13 | 5,14 | 5,15 |
| 6,0 | 6,1 | 6,2 | 6,3 | 6,4 | 6,5 | 6,6 | 6,7 | 6,8 | 6,9 | 6,10 | 6,11 | 6,12 | 6,13 | 6,14 | 6,15 |
| 7,0 | 7,1 | 7,2 | 7,3 | 7,4 | 7,5 | 7,6 | 7,7 | 7,8 | 7,9 | 7,10 | 7,11 | 7,12 | 7,13 | 7,14 | 7,15 |
| 8,0 | 8,1 | 8,2 | 8,3 | 8,4 | 8,5 | 8,6 | 8,7 | 8,8 | 8,9 | 8,10 | 8,11 | 8,12 | 8,13 | 8,14 | 8,15 |
| 9,0 | 9,1 | 9,2 | 9,3 | 9,4 | 9,5 | 9,6 | 9,7 | 9,8 | 9,9 | 9,10 | 9,11 | 9,12 | 9,13 | 9,14 | 9,15 |
| 10,0 | 10,1 | 10,2 | 10,3 | 10,4 | 10,5 | 10,6 | 10,7 | 10,8 | 10,9 | 10,10 | 10,11 | 10,12 | 10,13 | 10,14 | 10,15 |
| 11,0 | 11,1 | 11,2 | 11,3 | 11,4 | 11,5 | 11,6 | 11,7 | 11,8 | 11,9 | 11,10 | 11,11 | 11,12 | 11,13 | 11,14 | 11,15 |
| 12,0 | 12,1 | 12,2 | 12,3 | 12,4 | 12,5 | 12,6 | 12,7 | 12,8 | 12,9 | 12,10 | 12,11 | 12,12 | 12,13 | 12,14 | 12,15 |
| 13,0 | 13,1 | 13,2 | 13,3 | 13,4 | 13,5 | 13,6 | 13,7 | 13,8 | 13,9 | 13,10 | 13,11 | 13,12 | 13,13 | 13,14 | 13,15 |
| 14,0 | 14,1 | 14,2 | 14,3 | 14,4 | 14,5 | 14,6 | 14,7 | 14,8 | 14,9 | 14,10 | 14,11 | 14,12 | 14,13 | 14,14 | 14,15 |
| 15,0 | 15,1 | 15,2 | 15,3 | 15,4 | 15,5 | 15,6 | 15,7 | 15,8 | 15,9 | 15,10 | 15,11 | 15,12 | 15,13 | 15,14 | 15,15 | tbl1

| COLUMN NO. | FACIAL INFORMATION (PRESENCE/ ABSENCE) | POSITION INFORMATION ||
|---|---|---|---|
| | | UPPER LEFT XY COORDINATES | LOWER RIGHT XY COORDINATES |
| 0 | | | |
| 1 | | | |
| 2 | | | |
| 3 | | | |
| ⋮ | ⋮ | ⋮ | ⋮ |
| Cmax | | | | tbl1

| COLUMN NO. | FACE INFORMATION (PRESENCE/ ABSENCE) | POSITION INFORMATION | | COLOR INFORMATION |
|---|---|---|---|---|
| | | UPPE LEFT XY COORDINATES | LOWER RIGHT XY COORDINATES | |
| 0 | | | | |
| 1 | | | | |
| 2 | | | | |
| 3 | | | | |
| ⋮ | ⋮ | ⋮ | ⋮ | ⋮ |
| Cmax | | | | |

ELECTRONIC CAMERA WITH FEATURE IMAGE RECOGNITION

CROSS REFERENCE OF RELATED APPLICATION

The disclosure of Japanese Patent Application No. 2007-18630 is incorporated herein by reference.

BACKGROUND OF THE INVENTION

1. Field of the Invention

The present invention relates to an electronic camera. More specifically, the present invention relates to an electronic camera which adjusts an imaging condition by noting a feature point such as a face of a person, for example.

2. Description of the Related Art

In an example of such a kind of conventional camera, a size of a face of a person within an imaged image is specified on the basis of focus point information and angle of view information. Processing of detecting a face of a person is executed by utilizing a frame defined in a specific size and a database including customizing information unique to a user. The imaged image is recorded in a memory card through various correct processing which are performed on the facial image.

However, in the related art, when the face of the person is turned to the side or turns down, the face detecting processing fails, so that an image in a good condition may not be obtained.

SUMMARY OF THE INVENTION

In one aspect of the present invention, an electronic camera comprises: an imager for repeatedly outputting an object scene image; a first determiner for repeatedly determining prior to a condition adjustment whether or not the object scene image output from the imager has a feature image satisfying a specific condition; a producer for producing image information including a determination result by the first determiner; a decider for deciding a feature image position on the basis of the image information produced by the producer when a condition adjustment instruction is issued; and an adjuster for adjusting an imaging condition by noting the feature image position decided by the decider.

An object scene image is repeatedly output from an imager. A first determiner repeatedly determines prior to a condition adjustment whether or not the object scene image output from the imager has a feature image satisfying a specific condition. Image information including a determination result by the first determiner is produced by a producer. A decider decides a feature image position on the basis of the image information produced by the producer when a condition adjustment instruction is issued. An imaging condition is adjusted by an adjuster by noting the feature image position decided by the decider.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
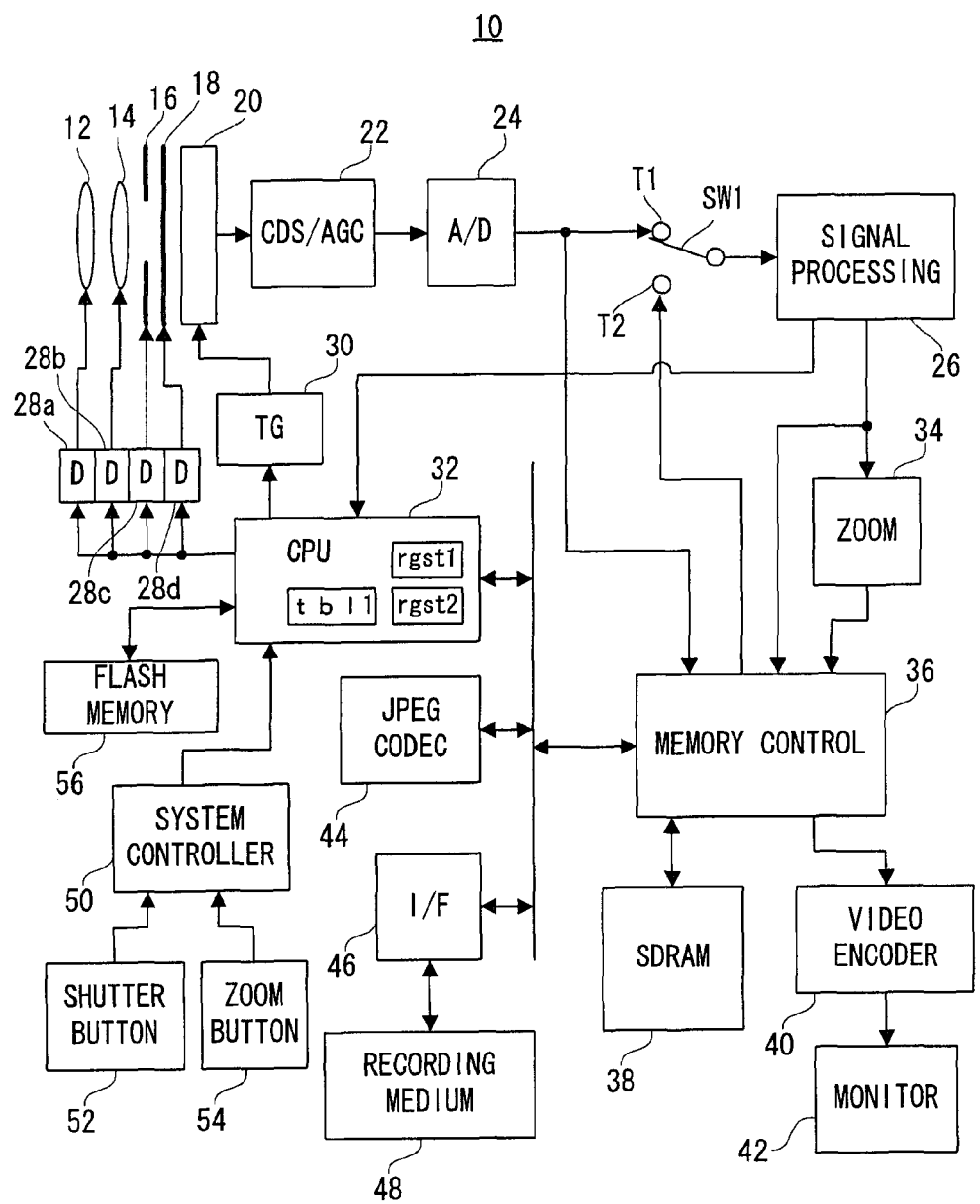
FIG. 1 is a block diagram showing a configuration of one embodiment of the present invention.

Referring to FIG. 1, a digital camera 10 of this embodiment includes a zoom lens 12, a focus lens 14, an aperture mechanism 16 and a shutter mechanism 18. An optical image of an object scene is irradiated onto an imaging surface of an image sensor 20 through these members. The imaging surface is covered with a color filter (not shown) on which color elements of R (Red), G (Green) and B (Blue) are arranged in a mosaic manner, and each pixel for a raw image signal to be generated by a photoelectronic conversion has color information of R, G or B.

When a power source is turned on, the CPU 32 instructs a TG (Timing Generator) 30 to repetitively perform a pre-exposure and a thinning-out reading in order to display a real-time motion image (through-image) of the object scene on the monitor 42, and sets a zoom magnification of a zoom circuit 34 to an initial magnification for a through-image. The TG 30 performs a pre-exposure on the image sensor 20 in response to a vertical synchronization signal Vsync generated for each 1/30 seconds, and reads a part of a raw image signal thus generated in a raster scanning manner. Thus, a low-resolution raw image signal alternately including a line being made up of R, G, R, G and a line being made up of G, B, G, B is output from the image sensor 20 at a rate of 1/30 seconds per frame.

A raw image signal of each frame output from the image sensor 20 is subjected to a noise removal and a level adjustment by a CDS/AGC circuit 22. An A/D converter 24 converts a raw image signal output from the CDS/AGC circuit 22 into raw image data being a digital signal. When a power source is first turned on, a switch SW1 is connected to a terminal T1 to input the raw image data output from the A/D converter 24 to a signal processing circuit 26 through the switch SW1.

Figures 2, 3:
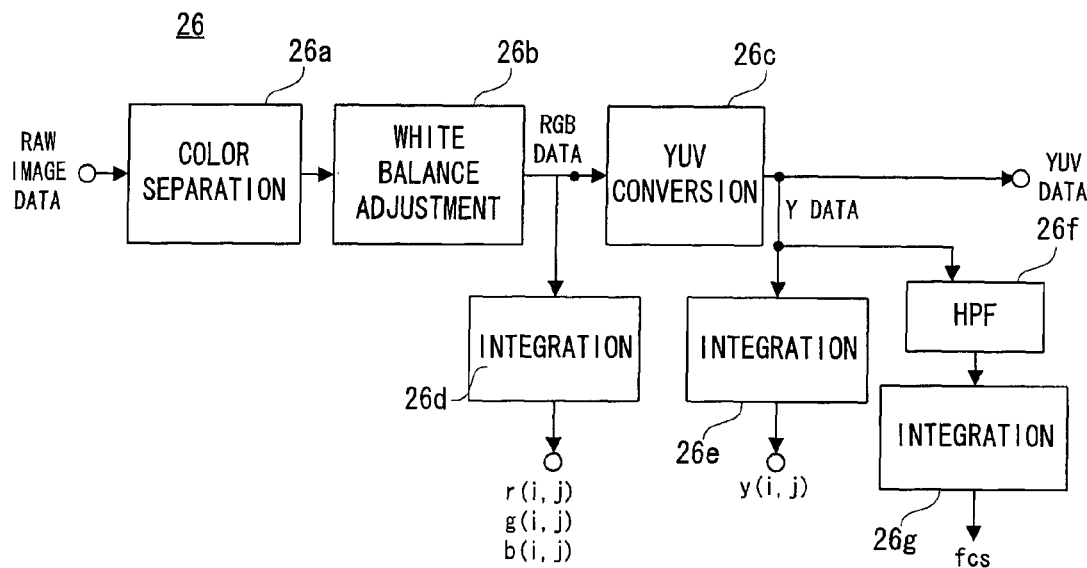
FIG. 2 is a block diagram showing one example of a configuration of a signal processing circuit applied to FIG. 1 embodiment.
FIG. 3 is an illustrative view showing a plurality of blocks assigned to an object scene.

The signal processing circuit 26 is constructed as shown in FIG. 2. Since each of the pixels being made up of the raw image data has only one color information of R, G and B, color information which is in short in each pixel is interpolated by a color separation circuit 26a. A white balance adjustment circuit 26b performs a white balance adjustment on interpolated image data output from the color separation circuit 26a. Interpolated image data on which the white balance adjustment is performed is converted into YUV data by a YUV conversion circuit 26c. The generated YUV data has a ratio of Y:U:V=4:2:2.

The interpolated image data output from the white balance adjustment circuit 26b can also be input to an integrating circuit 26d, and Y data being made up of the YUV data output from the YUV conversion circuit 26c is also applied to an integrating circuit 26e. Referring to FIG. 3, the object scene (screen) is divided into 16 in vertical and horizontal directions, and formed with 256 blocks on the screen. Each block is assigned a vertical position number i (=0-15) and a horizontal position number j (=0-15).

The integrating circuit 26d integrates each of R data, G data and B data being made up of the interpolated image data for each block, and the integrating circuit 26e integrates the Y data for each block. Thus, 256 integrated values r(i, j) in relation to R data, 256 integrated values g(i, j) in relation to G data, 256 integrated values b(i, j) in relation to B data are output from the integrating circuit 26d for each frame period, and 256 integrated values y(i, j) in relation to Y data are output from the integrating circuit 26e for each frame period.

The Y data output from the YUV conversion circuit 26c is also applied to an HPF 26f. The HPF 26f extracts a high-frequency component of the applied Y data, and applies the extracted high-frequency component to an integrating circuit 26g. The integrating circuit 26g integrates the high-frequency component belonging to an AF area set by the CPU 32 out of the applied high-frequency component for each frame period. Thus, a focus evaluation value fcs is output from the integrating circuit 26g for each frame period.

Returning to FIG. 1, the YUV data output from the signal processing circuit 26 is subjected to zoom processing according to a set magnification in the zoom circuit 34, and then written to a display image area 38a (see FIG. 4) of an SDRAM 38 by a memory control circuit 36. The YUV data stored in the display image area 38a has a resolution of horizontal 640 pixels×vertical 480 lines. A video encoder 40 reads such the YUV data from the display image area 38a though the memory control circuit 36, and encodes the read YUV data into a composite video signal. The encoded composite video signal is applied to the monitor 42 to thereby display a through-image on the monitor screen.

Then, the 256 integrated values y(i, j) output from the integrating circuit 26e shown in FIG. 2 is taken by the CPU 32 and set to a register rgst1. The integrated values y(i, j) are generated for each frame period, so that the set value of the register rgst1 is also updated for each frame period. The CPU 32 adjusts a pre-exposure time set to the TG 30 on the basis of the integrated values y(i, j) set to the register rgst1. As a result, brightness of a through-image displayed on the monitor screen is properly adjusted.

When a zoom button 54 is operated, a corresponding state signal is applied to the CPU 32 from the system controller 50. The CPU 32 controls a driver 28a to thereby move the zoom lens 12 in an optical axis direction. In a case that the zoom button 54 is continuously operated after the zoom lens 12 reaches a telephoto end, the CPU 32 increases the set magnification of the zoom circuit 34. A magnification of the through-image displayed on the monitor 42 changes according to the operation of the zoom button 54.

Figures 4, 5:
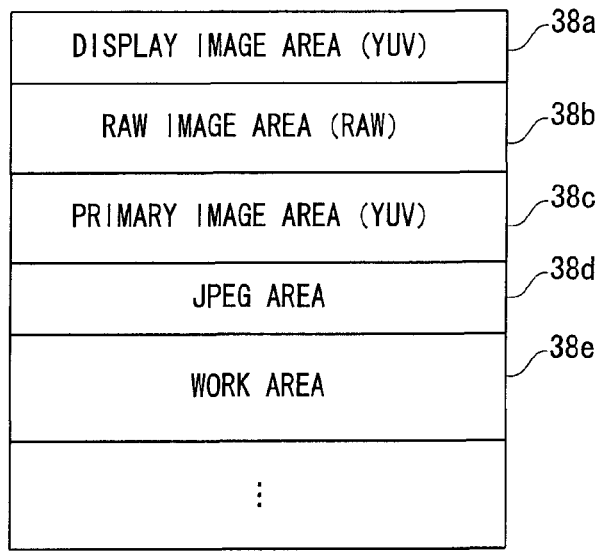
FIG. 4 is an illustrative view showing one example of a mapped state of an SDRAM applied to FIG. 1 embodiment.
FIG. 5 is an illustrative view showing one example of a face detection history table applied to FIG. 1 embodiment.

When the shutter button 52 is in a non-operated state, the CPU 32 executes history producing processing for describing a face detection history in a face detection history table tbl1 shown in FIG. 5. First, pattern recognizing processing is executed while the YUV data stored in the display image area 38a is noted. The pattern recognizing processing is processing for checking dictionary data corresponding to eyes, a nose, a mouth mouse of a person against the YUV data being noted to thereby detect an image of a face of a person from the object scene image.

However, the orientation of the face of the person takes various directions as shown in FIG. 6(A)-FIG. 6(F). In the pattern recognizing processing of this embodiment, the face shown in FIG. 6(A) or FIG. 6(F) can be recognized, but faces shown in FIG. 6(B)-FIG. 6(E) cannot be recognized. That is, in a case that the person within the object scene has a posture shown in FIG. 7(B), the pattern recognition is successful while in a case that the person within the object scene has a posture shown in FIG. 7(A), FIG. 7(C) or FIG. 7(D), the pattern recognition fails.

Figure 7:
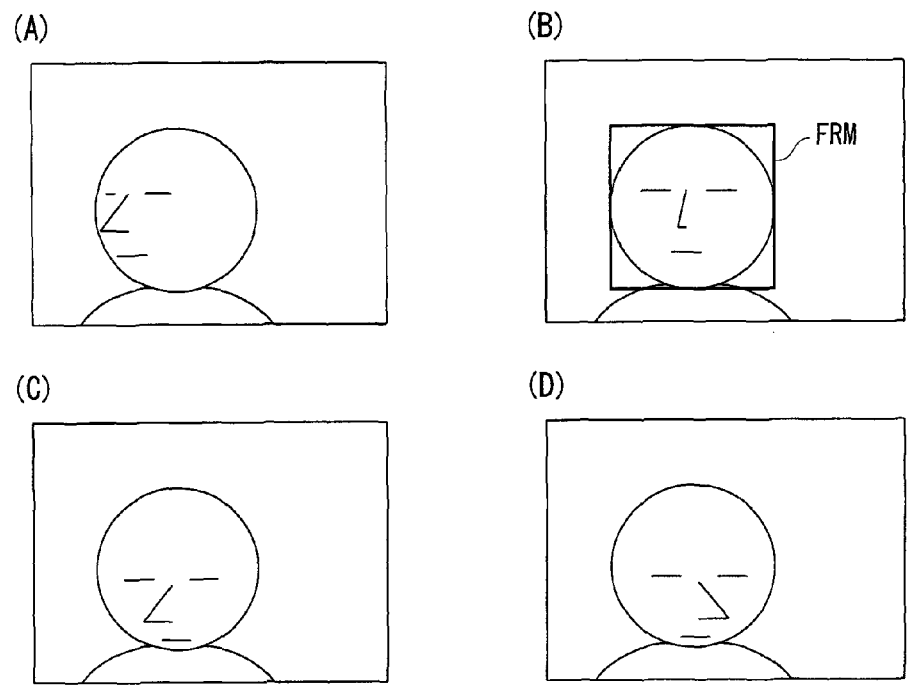
FIG. 7(A) is an illustrative view showing one example of an object scene image.
FIG. 7(B) is an illustrative view showing another example of the object scene image.
FIG. 7(C) is an illustrative view showing a still another example of the object scene image.
FIG. 7(D) is an illustrative view showing a further example of the object scene image.

If the pattern recognition is successful, facial information indicating "there is a face" and positional information indicating diagonal coordinates of a rectangular frame FRM (see FIG. 7(B)) surrounding the facial image are registered in a designated column of the face detection history table tbl1. If the pattern recognition fails, facial information indicating "there is no face" is registered in a designated column of the face detection history table tbl1.

The capacity for storing dictionary data (pattern data) used in the pattern recognizing processing has a limitation, so that it is impossible to store dictionary data corresponding to sizes and directions of all the faces in a case of a face of a person. Furthermore, if the data amount of the dictionary data is increased, it takes a time for the pattern recognizing processing, decreasing the operability. For this reason, even if a face of a person is within the object scene, recognition of the face may fails.

Figure 6:
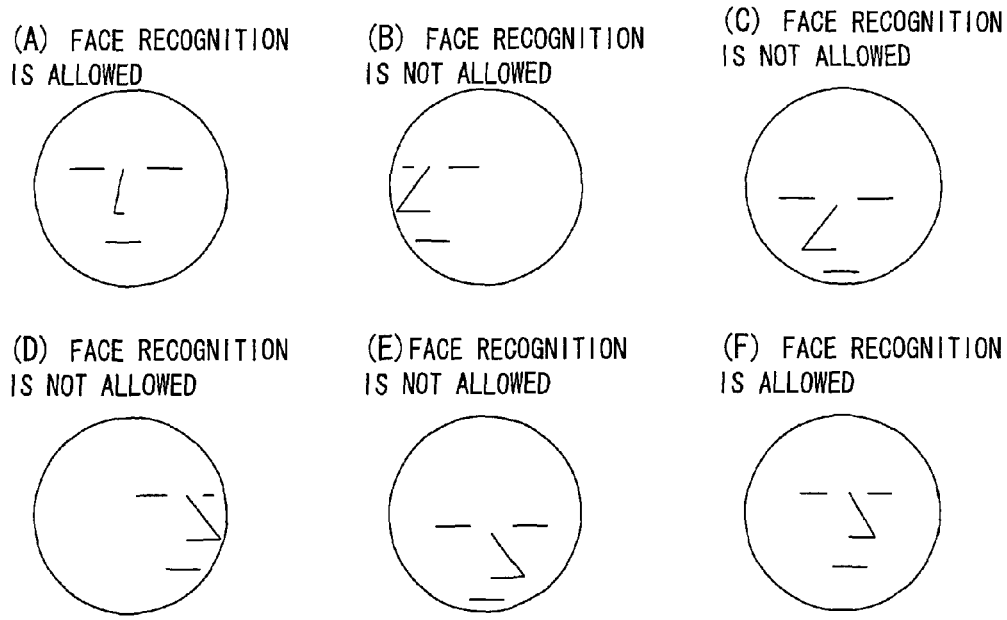
FIG. 6(A) is an illustrative view showing one example of an orientation of a face which allows pattern recognition.
FIG. 6(B) is an illustrative view showing one example of an orientation of the face which does not allow pattern recognition.
FIG. 6(C) is an illustrative view showing another example of an orientation of the face which does not allow pattern recognition.
FIG. 6(D) is an illustrative view showing a still another example of an orientation of the face which does not allow pattern recognition.
FIG. 6(E) is an illustrative view showing a further example of an orientation of the face which does not allow pattern recognition.
FIG. 6(F) is an illustrative view showing another example of an orientation of the face which allows pattern recognition.

As shown in FIG. 6(A) or FIG. 6(F), if the face is turned to the nearly front (imaging surface), that is, if the orientation of the face is a specific direction, the pattern recognition is successful. On the contrary thereto, if the face is turned to the side or turns down as shown in FIG. 6(B)-FIG. 6(E), that is, if the direction of the face is a direction different from the specific direction, the pattern recognition fails. In other words, each of FIG. 6(A) or FIG. 6(F) shows a case that the face of the person satisfies a direction condition, and each of FIG. 6(B)-FIG. 6(E) shows a case that the face of the person does not satisfy the direction condition.

Additionally, in this embodiment, data corresponding to faces having sizes different from each other for allowing recognitions of large faces and small faces are stored as dictionary data. For this reason, the positional information indicating the diagonal coordinates of the rectangular frame FRM are registered in the face detection history table tbl1. In place of the diagonal coordinates, a central coordinates of the rectangular frame FRM, and a horizontal size and a vertical size of the rectangular frame FRM may be registered as positional information. Furthermore, if the size of the face to be recognized is one, any coordinates of the coordinates of the four corners forming the rectangular frame FRM or the central coordinates of the rectangular frame FRM may be registered as positional information.

As understood from FIG. 5, the face detection history table tbl1 has Cmax+1 columns, and a designated column is updated circularly. Furthermore, the above-described pattern recognizing processing is executed every three frames (=1/10 seconds). Accordingly, in the face detection history table tbl1, Cmax+1 face detection histories produced during (Cmax+1)/10 seconds before the shutter button 52 is operated are described.

When the shutter button 52 is half-depressed, the CPU 32 determines or decides a face position on the basis of the face detection history described in the face detection history table tbl1. More specifically, if the facial information of the latest face detection history (the face detection history at a time when the shutter button 52 is half-depressed) indicates "there is a face", a position indicated by the positional information of the latest face detection history is decided as a face position. On the other hand, if the facial information of the latest face detection history indicates "there is no face", a latest face detection history including the facial information indicating "there is a face" is searched from the rest of the face detection histories of Cmax. If the search is successful, a position indicated by the positional information of the found face detection history is decided as a face position.

The focus adjustment is executed with noting the determined face position. That is, an AF area corresponding to the rectangular frame surrounding the determined face position is set to the integrating circuit 26g shown in FIG. 2, and hill-climbing AF processing is executed referring to a focus evaluation value fcs output from the integrating circuit 26g. The focus lens 14 moves in an optical axis direction by the driver 28b, and a focus is achieved on a main object belonging to the AF area, that is, the face of the person.

In addition, when the face position is not decided, the AF area covering the central position of the object scene is set to the integrating circuit 26g shown in FIG. 2, and a focus is achieved on the object at the central position.

In a case that the face position is decided, and a focus is achieved on the face of the person, it is confirmed whether or not the face of the person satisfies a portrait condition. As a portrait condition, mention is made of a case that a luminance of the object scene is equal to or more than a threshold value (=6 EV), that a distance to the object (the face of the person) belonging to the AF area is a preset range (=1 m-2 m), and that the color of the object belonging to the AF area is a skin color. If such a portrait condition is satisfied, the object scene is decided as a portrait scene. On the contrary thereto, if the portrait condition is not satisfied, the object scene is decided as an "undefined scene".

Additionally, if a focus is achieved on an object at the center because the face position cannot be decided, it is confirmed whether or not other scene condition is satisfied. The object scene is decided as a landscape scene, a night view scene or as an "undefined scene".

When the object scene is thus decided, AE processing corresponding to the decided object scene is executed. When the portrait scene is decided, the CPU 32 corrects the program diagram so as to blur the background and corrects a white balance adjustment gain so as to reduce a change of the skin color of the person. This turns the imaging mode to a portrait mode. When the landscape scene is decided, the CPU 32 corrects the program diagram so as to image a distance clearly, and corrects the white balance adjustment gain so as to shine a sky blue. This turns the imaging mode to a landscape mode. When the night view scene is decided, the CPU 32 corrects the program diagram so as to stand out the illumination. This turns the imaging mode to a night view mode.

Even if either scene is decided, the program diagram is corrected. Thus, after the object scene is decided, the CPU 32 takes integrated values r(i, j), g(i, j) and b(i, j) output from the integrating circuit 26e and integrated values y(i, j) output from the integrating circuit 26e in a register rgst2, and executes AE processing on the basis of the integrated values y(i, j) set in the register rgst2 and the corrected program diagram. Thus, the aperture amount and the exposure time are accurately adjusted.

When the shutter button 52 is full-depressed after completion of the AE processing, a corresponding state signal is applied from the system controller 50 to the CPU 32. The CPU 32 executes imaging processing. More specifically, the CPU 32 instructs the TG 30 to execute a primary exposure, and drives the shutter mechanism 16 by the driver 28d at the time that the primary exposure by the TG 30 is completed. By the driving of the shutter mechanism 16, an incident light to the image sensor 20 is intercepted. The CPU 32 also instructs the TG 30 to perform an all-pixels reading in order to output one frame of raw image signal obtained by the primary exposure from the image sensor 20. Thus, a high-resolution raw image signal is read from the image sensor 20 in an interlaced scanning system.

The read raw image signal is subjected to the processing described above by the CDS/AGC circuit 22 and the A/D converter 24, and raw image data thus generated is written to a raw image area 38b (see FIG. 4) of the SDRAM 38 by the memory control circuit 36. The raw image data is an interlaced scanning signal, so that an odd field signal is stored in a front-half portion of the raw image area 38b, and an even field signal is stored in a back-half portion of the raw image area 38b. That is, the odd field area and the even field area are formed in the raw image area 38b.

After completion of writing to the raw image area 38b, the memory control circuit 36 alternately reads the raw image data from the odd field area and the even field area at every line. Thus, the interlaced scan data is converted into progressive scan data. The switch SW1 is connected to a terminal T2 at a time that the shutter button 52 is fully-depressed. Thus, the raw image data read by the memory control circuit 36 is applied to the signal processing circuit 26 via the switch SW1. In the signal processing circuit 26, a series of processing such as a color separation, a white balance adjustment and a YUV conversion are executed to generate high-resolution YUV data.

The zoom magnification of the zoom circuit 34 is set to a magnification for freeze image when the shutter button 54 is fully-depressed. Thus, the YUV data output from the signal processing circuit 26 is subjected to reduction zooming processing according to the set magnification, and YUV data output from the zoom circuit 34 is written to the display image area 38a shown in FIG. 4 by the memory control circuit 36. In what follows, processing the same as that when a through-image is displayed is executed, so that a freeze image at a time that the shutter button 52 is operated is displayed on the monitor 42.

The YUV data output from the signal processing circuit 26 is also directly applied to the memory control circuit 36 so as to be written to a primary image area 38c (see FIG. 4) of the SDRAM 38. The YUV data stored in the primary image area 38c is applied to the JPEG codec 44 by the memory control circuit 36. The JPEG codec 44 compresses the applied YUV data in a JPEG format to generate compressed YUV data, that is, JPEG data. The generated JPEG data is written to a JPEG area 38d (see FIG. 4) of the SDRAM 38 by the memory control circuit 36.

After completion of the imaging processing, the CPU 32 executes recording processing. More specifically, the CPU 32 accesses the SDRAM 38 via the memory control circuit 36, and reads the JPEG data from the JPEG area 38d. The CPU 32 further records the read JPEG data in the recording medium 48 in a file format. It should be noted that the recording medium 48 is detachable, and access to the recording medium 48 is performed via the I/F 46.

Figure 8:
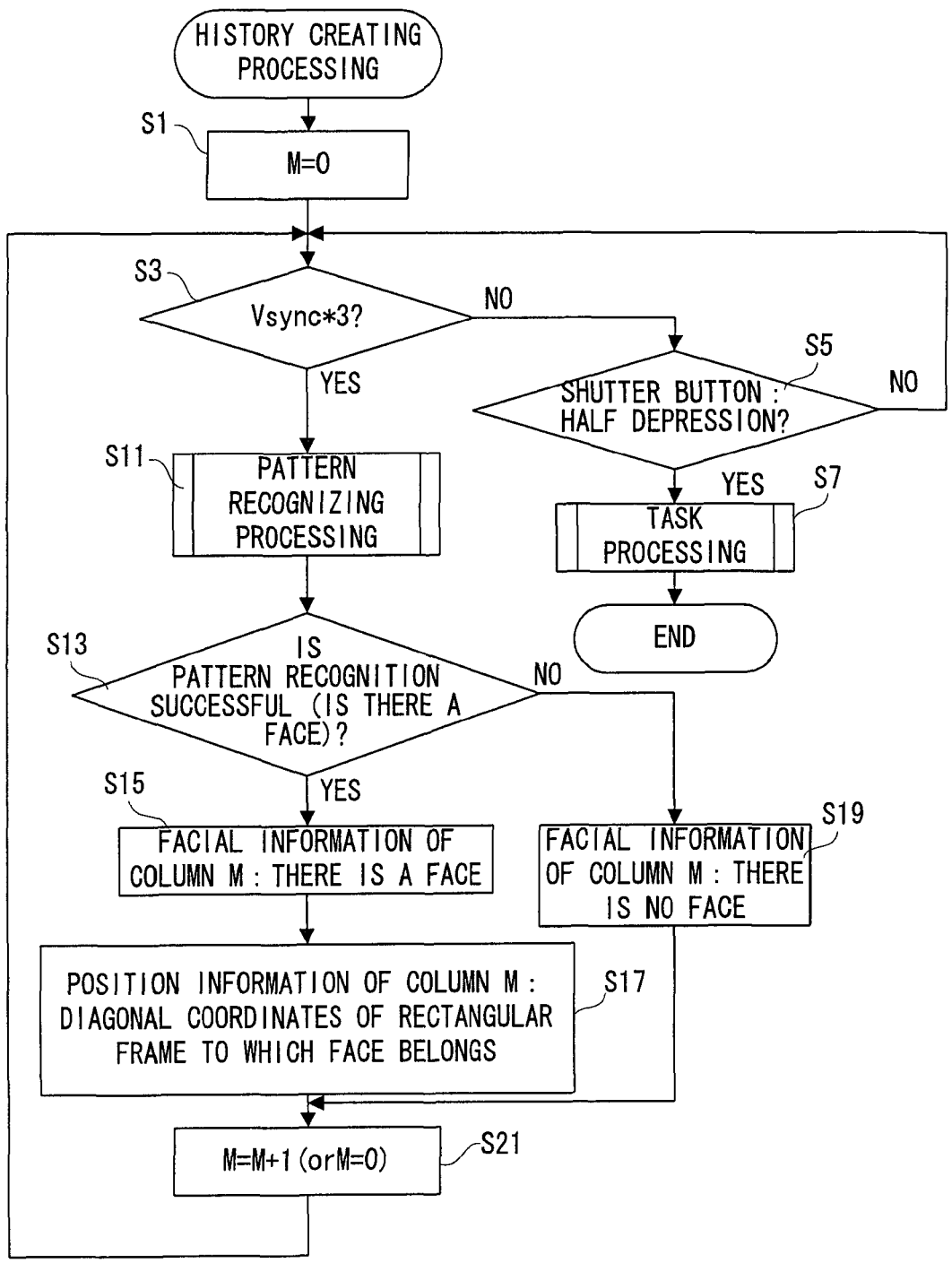
FIG. 8 is a flowchart showing a part of an operation of a CPU applied to FIG. 1 embodiment.
Figure 9:
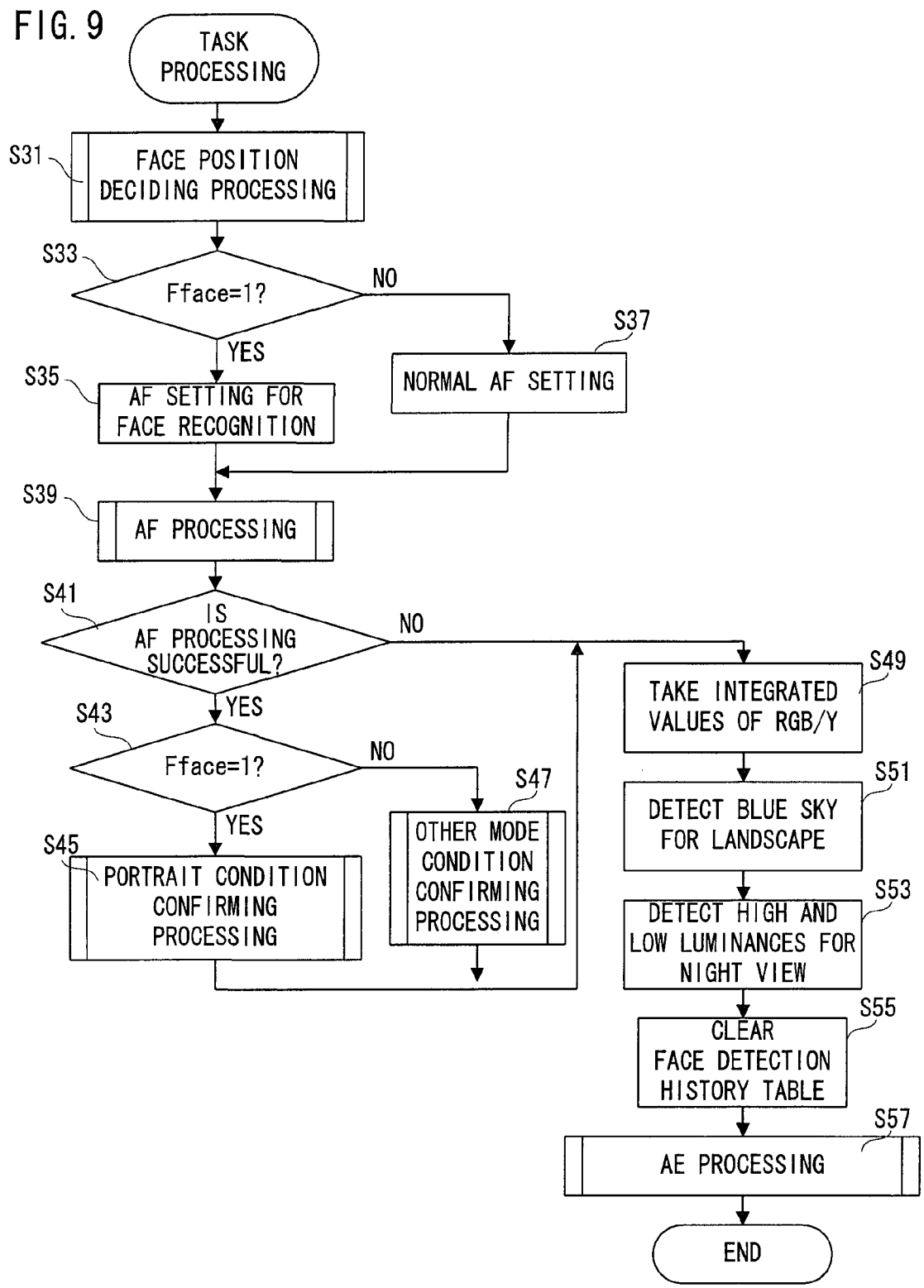
FIG. 9 is a flowchart showing another part of the operation of the CPU applied to FIG. 1 embodiment.
Figure 10:
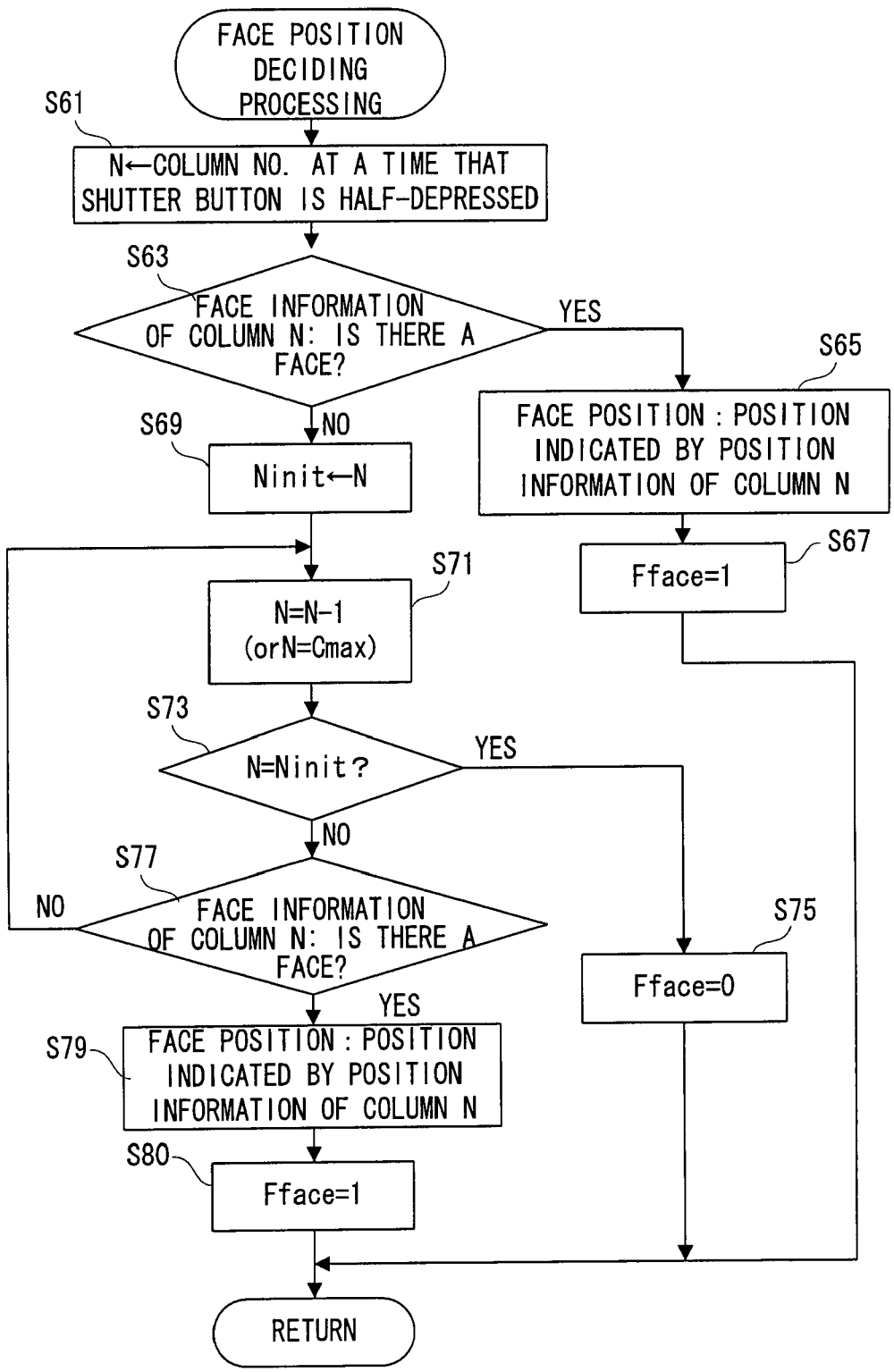
FIG. 10 is a flowchart showing a still another part of the operation of the CPU applied to FIG. 1 embodiment.
Figure 11:
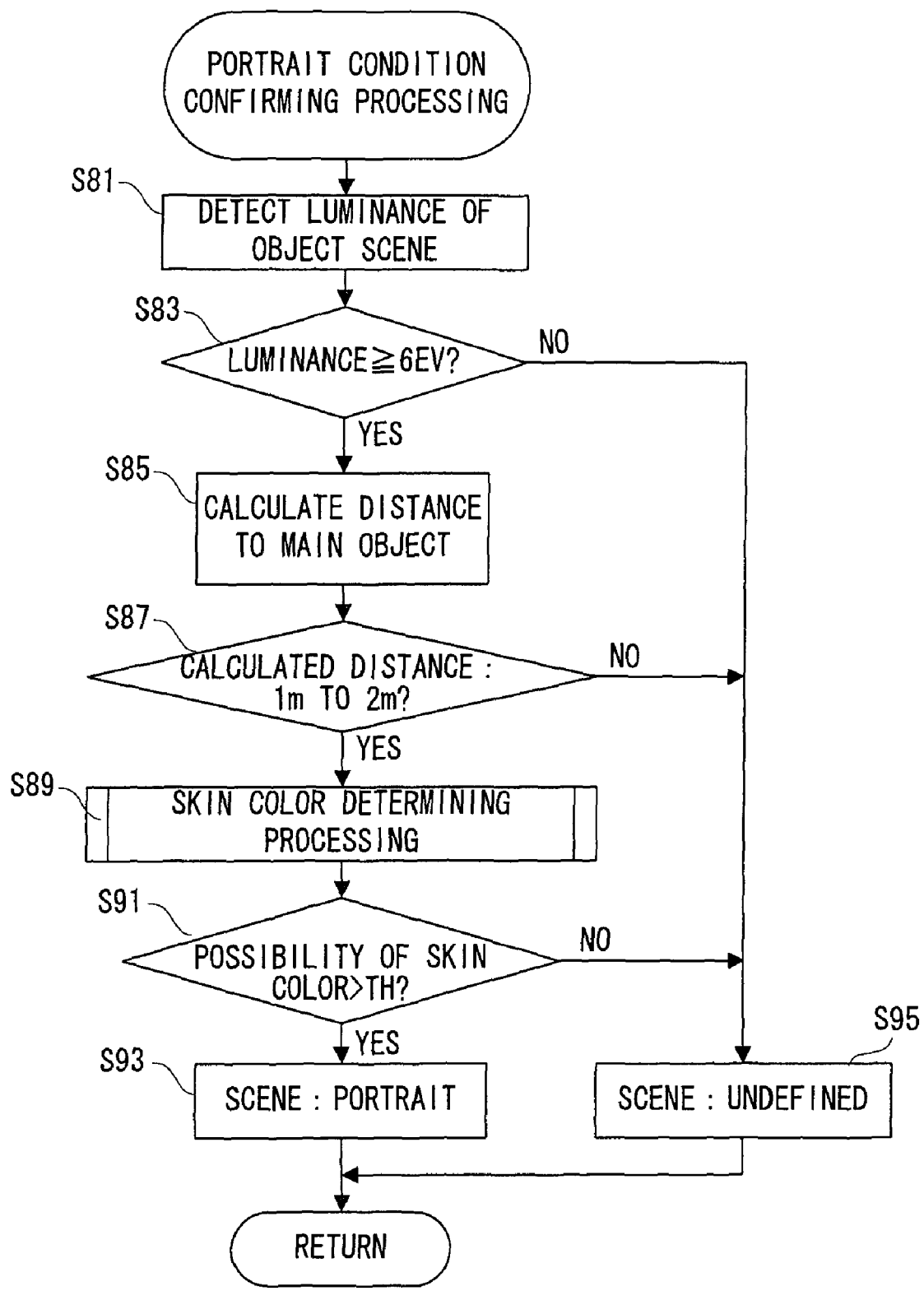
FIG. 11 is a flowchart showing a further part of the operation of the CPU applied to FIG. 1 embodiment.

When the power source is turned on, the CPU 32 executes history producing processing shown in FIG. 8, and when the shutter button 52 is half-depressed, the CPU 32 executes task processing shown in FIG. 9-FIG. 11. Additionally, a control program corresponding to such processing is stored in a flash memory 56.

With reference to the FIG. 8, in a step S1, a variable M for designating any one of the columns on the face detection history table tbl1 shown in FIG. 5 is set to "0". In a step S3, it is determined whether or not a vertical synchronization signal Vsync is generated three times. In a step S5, it is determined whether or not the shutter button 52 is half-depressed. If "YES" in the step S3, the process proceeds to a step S11 onward. On the contrary thereto, if the shutter button 52 is half-depressed, the process proceeds to a step S7 from the step S5 to execute the task processing shown in FIG. 9-FIG. 11 and to end the history producing processing. Then, if the shutter button 52 is fully-depressed, or has already been fully-depressed, imaging processing and recording processing are executed, and then, the history producing processing is restarted. Furthermore, if the half depression of the shutter button 52 is canceled, the history producing processing is restarted.

In the step S11, pattern recognizing processing noted on eyes, a nose, and a mouth of a person is executed in order to detect a face of a person image from the object scene image. In this processing, the YUV data stored in the display image area 38a shown in FIG. 4 is referred. In a step S13, it is determined whether or not pattern recognition is successful (whether or not a face of a person is present in the object scene). If "NO" is determined here, the facial information indicating "there is no face" is written to a column M of the face detection history table tbl1 in a step S19, and then, the process proceeds to a step S21. If "YES" in the step S13, the facial information indicating "there is a face" is written to the column M in a step S15, and diagonal coordinates (upper left XY coordinates, lower right XY coordinates) of the rectangular frame FRM to which the face belongs are described in the column M in a step S17, and then, the process proceeds to the step S21.

In the step S21, the variable M is incremented. Here, if the incremented variable M is above the maximum column number Cmax, the variable M is returned to "0". Thus, the variable M is circularly updated. After completion of the processing in the step S21, the process returns to the step S3.

With reference to FIG. 9, in a step S31, face position deciding processing is executed. The face position deciding processing is executed by referring to the face detection history table tbl1. If the face position is decided, a flag Fface is set to "1" while if the face position is not decided, the flag Fface is set to "0". In a step S33, such a state of the flag Fface is determined. If Fface=1, an AF setting for face recognition is performed in a step S35, and if Fface=0, a normal AF setting is performed in a step S37. The AF area set to the integrating circuit 26g shown in FIG. 2 is aligned with the face position when the processing in the step S35 is executed while the AF area is aligned with the central position when the processing in the step S37 is executed. In a step S39, AF processing is executed to bring the object belonging to the set AF area into focus. When the processing in the step S35 is executed, focus is achieved on the face of the person.

In a step S41, it is determined whether or not the AF processing is successful (whether or not the focus lens 14 is set to the focus point). If "NO", the process directly proceeds to a step S49 while if "YES", the process proceeds to the step S49 through processing in steps S43-S47. In the step S43, the state of the flag Fface is determined again. If Fface=1, portrait condition confirming processing is executed in the step S45 while if Fface=0, other mode condition confirming processing is executed in the step S47.

In the step S49, the integrated values r(i, j), g(i, j), b(i, j) and y(i, j) output from the integrating circuits 26d and 26e shown in FIG. 2 are taken in the register rgst2. In a step S51, landscape-directed blue-sky detection is executed on the basis of the taken integrated values r(i, j), g(i, j) and b(i, j). In a step S53, night view-directed high and low luminance detection is executed on the basis of the taken integrated values y(i, j). The blue sky detected in the step S51 is referred when the object scene is decided as a landscape scene, and the high and low luminances detected in the step S53 are referred when the object scene is decided as a night view scene. After completion of the processing in the step S53, the face detection history table tbl1 is cleared in a step S55. The AE processing corresponding to the object scene decided is executed in a step S57, and the task processing is ended.

The face position deciding processing shown in the step S31 shown in FIG. 9 complies with a subroutine shown in FIG. 10. First, in a step S61, the column number (=M) which is noted at a time that the shutter button 52 is half-depressed is set to a variable N. In a step S63, it is determined whether or not the facial information forming the face detection history in the column N indicates "there is a face". If "YES", the process proceeds to a step 65 to decide a position defined by the positional information of the column N as a face position. In a step S67, the flag Fface is set to "1", and then, the process is restored to the routine at the hierarchical upper level.

If "NO" in the step S63, the variable N is saved in a variable Ninit in a step S69, and the variable N is decremented in a step S71. Here, if the decremented variable N is "−1", the variable N is changed to the maximum column number Cmax. In a step S73, it is determined whether or not the updated variable N is equal to the variable Ninit, and if "NO", processing similar to the processing of the above-described step S63 is executed in a step S77.

If "NO" in the step S77, the process returns to the step S71 while if "YES", processing similar to that in the above-described steps S65-S67 is executed in steps S79-S80, and then, the process is restored to the routine at the hierarchical upper level. When "YES" is determined in the step S73, it is regarded that all the facial information registered in the face detection history table 36*t* indicates "there is no face", in the step S75, the flag Fface is set to "0", and the process is restored to the routine at the hierarchical upper level.

The portrait condition confirming processing in the step S45 shown in FIG. 9 complies with a subroutine shown in FIG. 11. First, in a step S81, a luminance of the object scene is detected on the basis of the integrated values y(i, j) set to the register rgst1. In a step S83, it is determined whether or not the obtained luminance is equal to or more than a threshold value (=6 EV). If "NO", the object scene is decided as an "undefined scene" in a step S95 while if "YES", the process proceeds to a step S85.

In the step S85, the distance to the object (face of person) belonging to the decided face position is calculated on the basis of the focus point of the focus lens 14, and in a step S87, it is determined whether or not the calculated distance falls within a preset range (1 m-2 m). If "NO" is determined here, the process proceeds to the step S95 while if "YES", the process proceeds to a step S89.

In the step S89, skin color determining processing is executed for determining the possibility of the object (face of person) which belongs to the decided face position being a skin color. As a result, the possibility of the color of the noting object being a skin color is calculated. In a step S91, it is determined whether or not the calculated possibility is above a threshold value TH, and if "NO", the process proceeds to the step S95 while if "YES", the object scene is decided as a portrait scene in a step S93. After completion of the processing in the step S93 or S95, the process is restored to the routine at the hierarchical upper level.

Figure 12:
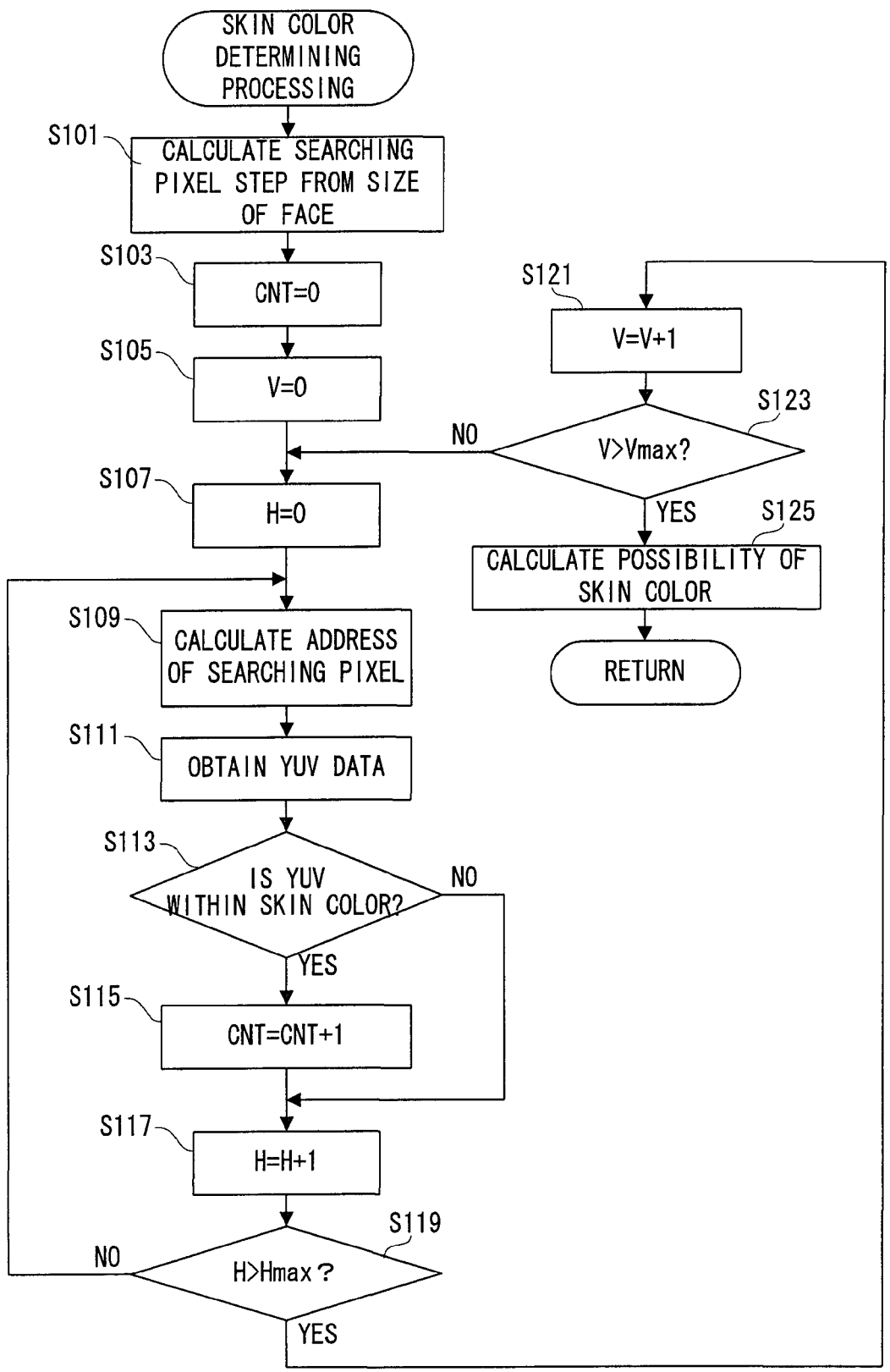
FIG. 12 is a flowchart showing a still further part of the operation of the CPU applied to FIG. 1 embodiment.

The skin color determining processing complies with a subroutine shown in FIG. 12. In a step S101, a searching pixel step is calculated on the basis of a size of the rectangular frame FRM corresponding to the face position. The searching pixel is designated for each calculated searching pixel step (the number of pixels). In a step S103, a variable CNT for counting pixels having a skin color is set to "0", in a step S105, a variable V for counting the number of pixels in a vertical direction is set to "0", and in a step S107, a variable H for counting the number of pixels in a horizontal direction is set to "0".

In a step S109, an address of the searching pixel is calculated on the basis of a searching pixel step calculated in the step S101 and the variables H and V, and in a step S111, one pixel of YUV data is read from the calculated address. In a step S113, it is determined whether or not the color reproduced by the read YUV data is within a skin color, and if "NO" is determined, the process directly proceeds to a step S117 while if "YES", the variable CNT is incremented in a step S115 and then, the process proceeds to the step S117.

In the step S117, the variable H is incremented, and in a step S119, it is determined whether or not the incremented variable H is above a preset maximum value Hmax. If "NO" is determined here, the process returns to the step S109 while if "YES" is determined, the variable V is incremented in a step S121. In a step S123, it is determined whether or not the incremented variable V is above a preset maximum value Vmax, and if "NO", the process returns to the step S107 while if "YES", the process proceeds to a step S125. In the step S125, a possibility of the color which belongs to the noting rectangular frame FRM being a skin color is calculated on the basis of the variable CNT, and after completion of the calculating processing, the process is restored to the routine at the hierarchical upper level.

As understood from the above-described description, the object scene image is repeatedly output from the image sensor 20. The CPU 32 repeatedly determines whether or not the object scene image output from the image sensor 20 has a face image (feature image satisfying a specifying condition) turned to the imaging surface prior to a half depression (condition adjusting instruction) of the shutter button 52 (S11, S13). The face detection history (image information) including the determination result is produced on the face detection history table tbl1 by the CPU 32 (S15, S17, S19). The CPU 32 decides a face image position on the basis of the face detection history described in the face detection history table tbl1 when the shutter button 52 is half-depressed. An imaging condition such as a focus is adjusted while the decided face image position (S35, S39) is noted.

Thus, whether or not the object scene image has a face image turned to the imaging surface is repeatedly determined prior to a half depression of the shutter button 32. When the shutter button 32 is half-depressed, a face image position is decided on the basis of the face detection history including these determination results. That is, even if the latest determination result is negative, if any one of the rest of the determination results is affirmative, the face image position is decided. This make is possible to properly adjust the imaging condition while the facial image is noted.

Figures 13, 14:
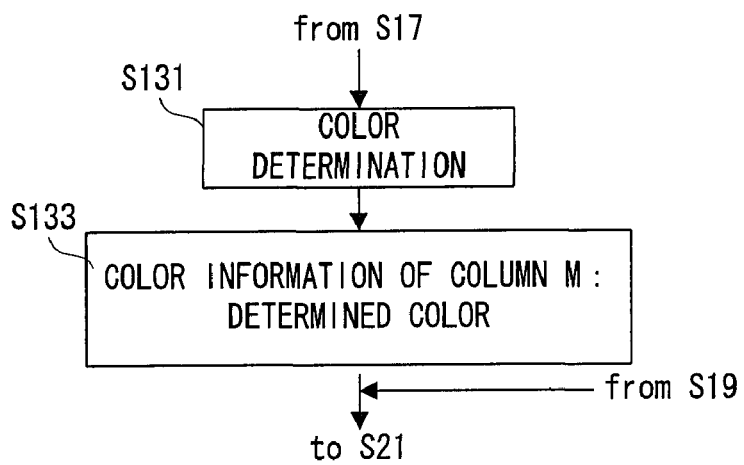
FIG. 13 is a flowchart showing one example of a face history detecting table applied to other embodiment of the present invention.
FIG. 14 is a flowchart showing a part of an operation of the CPU applied to the other embodiment of the present invention.
Figure 15:
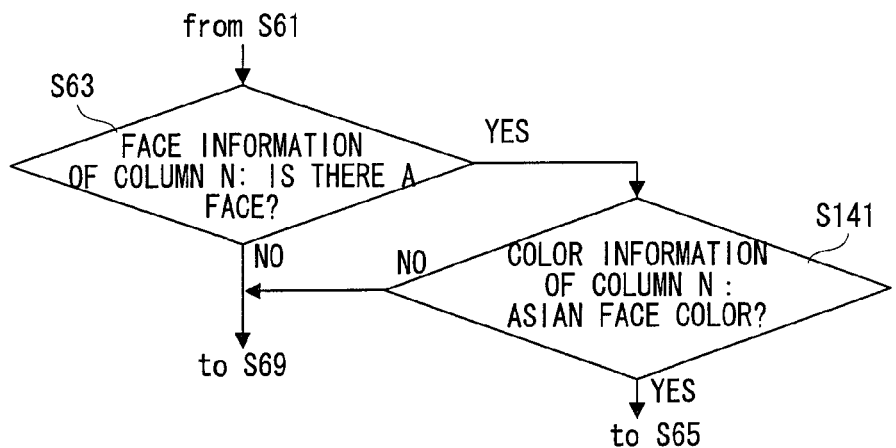
FIG. 15 is a flowchart showing another part of the operation of the CPU applied to the other embodiment of the present invention.

Additionally, in this embodiment, the information being made up of the face detection history is facial information indicating "there is a face" or "there is no face" and positional information of the rectangular frame FRM surrounding the facial image, but facial color information (Asian skin color/Anglo-Saxon skin color/African skin color) may be added thereto. In this case, the face detection history table tbl1 has to be constructed as shown in FIG. 13. In addition, steps S131 and S133 shown in FIG. 14 are inserted between the step S17 and the step S21 shown in FIG. 8, determination processing in a step S141 shown in FIG. 15 is executed in parallel with the determination processing in the step S63 shown in FIG. 10, and determination processing in a step S143 shown in FIG. 16 has to be executed after the determination processing in the step S77 shown in FIG. 10.

Figure 16:
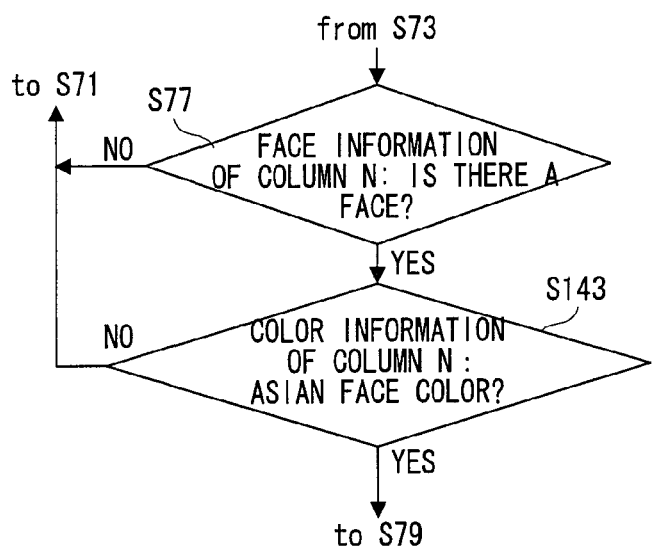
FIG. 16 is a flowchart showing a still another part of the operation of the CPU applied to the other embodiment of the present invention.

Referring to FIG. 14, in the step S131, which color the color of the facial image is determined from the above-described three colors. In the step S133, color information indicating the determined color is described in the column M. Referring to FIG. 15, if "YES" in the step S63, it is determined whether or not the color information of the column N is an Asian skin color in the step S141. If "NO" is determined, the process proceeds to the step S69 while if "YES", the process proceeds to the step S65. Referring to FIG. 16, if "YES" is determined in the step S77, it is determined whether or not the color information of the column N is an Asian skin color in the step S143. If "NO" is determined, the process returns to the step S71 while if "YES" is determined, the process proceeds to the step S79. This makes it possible to improve accuracy of face recognition when an Asian face is imaged.

Additionally, when accuracy of a face recognition when an Anglo-Saxon face is imaged is desired to be improved, whether or not the color information of the column N is an Anglo-Saxon skin color may be determined in the steps S141 and S143, and when accuracy of a face recognition when an African face is imaged is desired to be improved, whether or not the color information of the column N is an African skin color may be determined in the steps S141 and S143.

Figure 17:
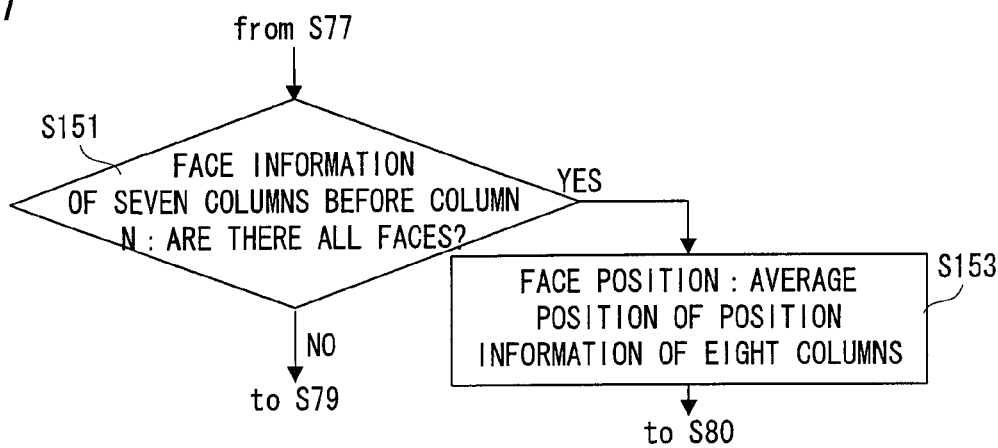
FIG. 17 is a flowchart showing a further part of the operation of the CPU applied to the other embodiment of the present invention.

Furthermore, in this embodiment, when the latest face detection history including the facial information indicating "there is a face" is detected, a position indicated by the positional information being made up of the face detection history is decided as a face position, but when a plurality of face detection histories (8, for example) continuously indicating "there is a face" are detected, an average position of the positions indicated by the positional information within the face detection history may be decided as a face position. In this case, steps S151 and S153 shown in FIG. 17 have to be added between the steps S77 and S79 shown in FIG. 10.

Referring to FIG. 10, if "YES" in the step S77, it is determined whether or not all the facial information of the seven columns before the column N indicates "there is a face". If "NO" here, the process proceeds to the step S79 while if "YES", the process proceeds to the step S153. In the step S153, an average position of the eight positions indicated by the positional information of the column N and the seven columns before is decided as a face position. After completion of the processing in the step S153, the process proceeds to the step S80. This makes it possible to secure a determining operation of the face position.

Furthermore, in this embodiment, an image of a face of a person is regarded as a feature image, but an image of an animal such as a dog, a cat, etc. may be regarded as a feature image, or an image of a ball used in sports may be regarded as a feature image.

Additionally, in this embodiment, the pattern recognizing processing in the step S11 shown in FIG. 8 is executed prior to the half depression of the shutter button 52, but it may be possible that the pattern recognizing processing is executed after the shutter button 52 is half-depressed. In this case, the history producing processing is continued, and the face position deciding processing is periodically executed before the shutter button 52 is full-depressed, and whereby, it is possible to respond to a change of the face position even after the half depression of the shutter button 52.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
an imager which repeatedly outputs an object scene image;
a first determiner which repeatedly determines prior to a condition adjustment whether or not the object scene image output from said imager has a feature image satisfying a specific condition;
a producer which produces image information including a determination result by said first determiner;
a decider which decides a feature image position on the basis of the image information produced by said producer when a condition adjustment instruction is issued;
an adjuster which adjusts an imaging condition by noting the feature image position decided by said decider, and
a second determiner which determines whether or not the latest image information produced by said producer satisfies a preset condition, wherein
said decider includes a first position decider which decides said feature image position on the basis of the latest image information produced by said producer when said second determiner determines that the latest image information satisfies a preset condition, and a second position decider which decides said feature image position on the basis of other image information produced by said producer when said second determiner determines that the latest image information does not satisfy the preset condition.

2. The electronic camera according to claim 1, wherein the other image information noted by said second position decider is image information satisfying said preset condition.

3. The electronic camera according to claim 1, wherein said preset condition includes a condition that said first determiner determines that said object scene image has a feature image satisfying a specific condition.

4. The electronic camera according to claim 3, wherein said producer includes a color information producer which produces color information indicating a color of said feature image as an element of said image information when said first determiner determines that said object scene image has a feature image satisfying a specific condition,
said preset condition further includes a condition that the color indicated by said color information fall within a preset color range.

5. The electronic camera according to claim 1, wherein said producer includes a positional information producer which produces positional information indicating a position of said feature image as an element of said image information when said first determiner determines that said object scene image has a feature image satisfying specific condition.

6. The electronic camera according to claim 1, wherein said feature image is an image of a face of a person, and said specific condition includes a direction condition that said face of a person is turned to a specific direction.

7. The electronic camera according to claim 6, further comprising a scene decider which decides a scene as a portrait scene when a distance to a face corresponding to said facial image and a color of said facial image satisfy a portrait condition.

8. The electronic camera according to claim 1, wherein an imaging condition adjusted by said adjuster includes a focus.

9. The electronic camera according to claim 1, wherein said first determiner executes determination processing by utilizing pattern recognition.

10. The electronic camera according to claim 1, wherein said producer produces said image information on a table as a history.

11. A non-transitory computer readable recording medium, said recording medium has an imaging control program, said imaging control program causes a processor of an electronic camera with an imager which repeatedly outputs an object scene image to execute:
a first determining step which repeatedly determines prior to a condition adjustment whether or not the object scene image output from said imager has a feature image satisfying a specific condition;
a producing step which produces image information including a determination result by said first determining step;
a deciding step which decides a feature image position on the basis of the image information produced by said producing step when a condition adjustment instruction is issued;
an adjusting step which adjusts an imaging condition by noting the feature image position decided by said deciding step, and
a second determiner which determines whether or not the latest image information produced by said producer satisfies a preset condition, wherein
said decider includes a first position decider which decides said feature image position on the basis of the latest image information produced by said producer when said second determiner determines that the latest image information satisfies a preset condition, and a second position decider which decides said feature image position on the basis of other image information produced by said producer when said second determiner determines that the latest image information does not satisfy the preset condition.

12. An imaging control method of an electronic camera with an imager which repeatedly outputs an object scene image, including:
- a first determining step which repeatedly determines prior to a condition adjustment whether or not the object scene image output from said imager has a feature image satisfying a specific condition;
- a producing step which produces image information including a determination result by said first determining step;
- a deciding step which decides a feature image position on the basis of the image information produced by said producing step when a condition adjustment instruction is issued; and
- an adjusting step which adjusts an imaging condition by noting the feature image position decided by said deciding step, and
- a second determiner which determines whether or not the latest image information produced by said producer satisfies a preset condition, wherein
- said decider includes a first position decider which decides said feature image position on the basis of the latest image information produced by said producer when said second determiner determines that the latest image information satisfies a preset condition, and a second position decider which decides said feature image position on the basis of other image information produced by said producer when said second determiner determines that the latest image information does not satisfy the preset condition.

* * * * *